No. 871,032. PATENTED NOV. 12, 1907.
W. A. CHEESEBRO.
MEANS TO RECORD THE SPEED OF AUTOMOBILES.
APPLICATION FILED JAN. 25, 1906.

2 SHEETS—SHEET 1.

Witnesses

Inventor
William A. Cheesebro
By Hazard & Harpham
Attorneys.

No. 871,032. PATENTED NOV. 12, 1907.
W. A. CHEESEBRO.
MEANS TO RECORD THE SPEED OF AUTOMOBILES.
APPLICATION FILED JAN. 25, 1906.
2 SHEETS—SHEET 2.
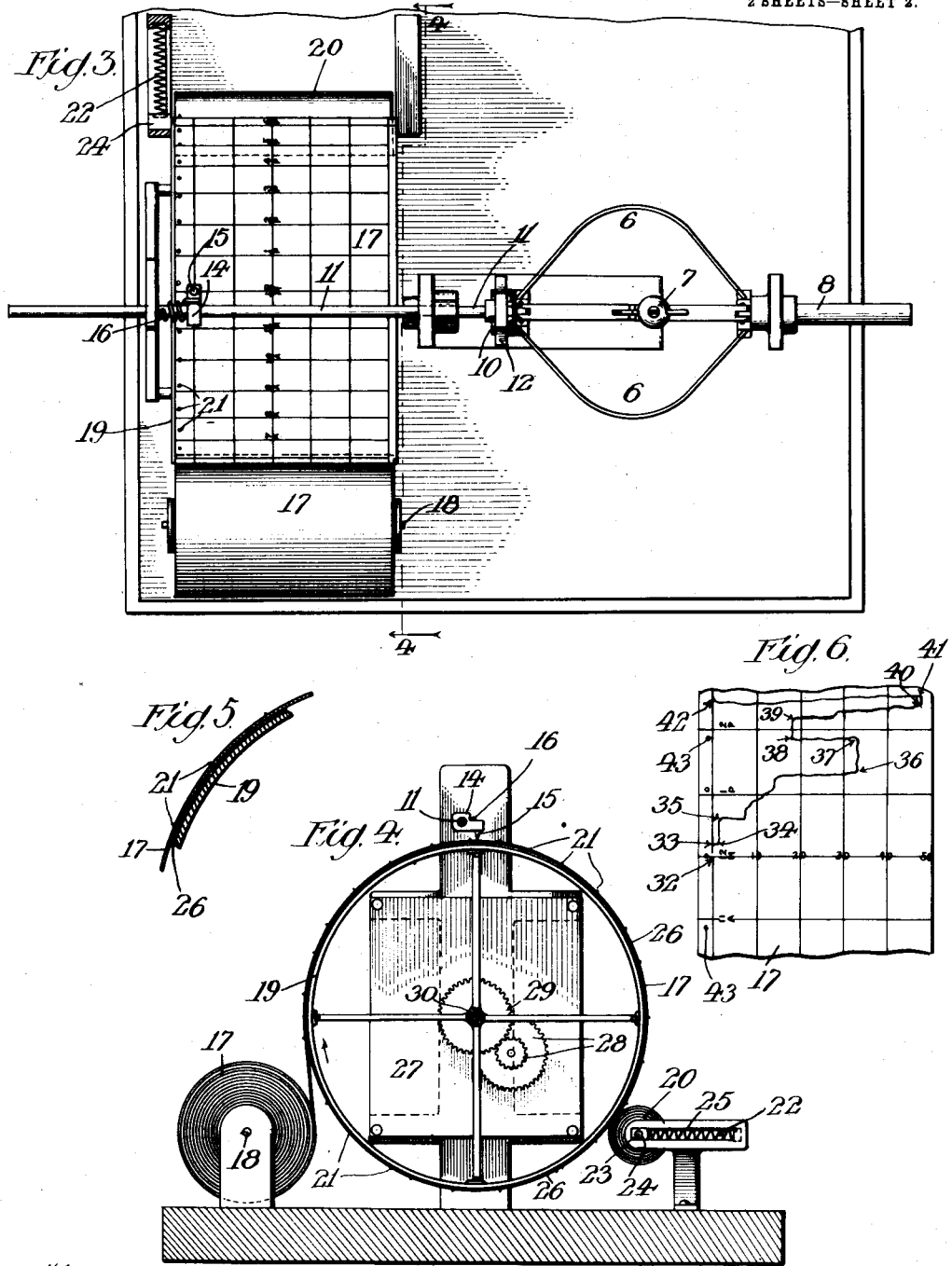

UNITED STATES PATENT OFFICE.

WILLIAM A. CHEESEBRO, OF LOS ANGELES, CALIFORNIA, ASSIGNOR, BY DIRECT AND MESNE ASSIGNMENTS, OF ONE-THIRD TO DAVID E. LYONS AND ONE-THIRD TO WILLIAM H. SHEASBY, BOTH OF LOS ANGELES, CALIFORNIA.

MEANS TO RECORD THE SPEED OF AUTOMOBILES.

No. 871,032.      Specification of Letters Patent.      Patented Nov. 12, 1907.

Application filed January 25, 1906. Serial No. 297,845.

*To all whom it may concern:*

Be it known that I, WILLIAM A. CHEESEBRO, a citizen of the United States, residing at Los Angeles, in the county of Los Angeles and State of California, have invented new and useful Improvements in Means to Record the Speed of Automobiles, of which the following is a specification.

The object of my invention is to provide means to record the speed at which an automobile is driven. I accomplish this object by means of the device described herein and shown in the accompanying drawings in which:—

Figure 1:
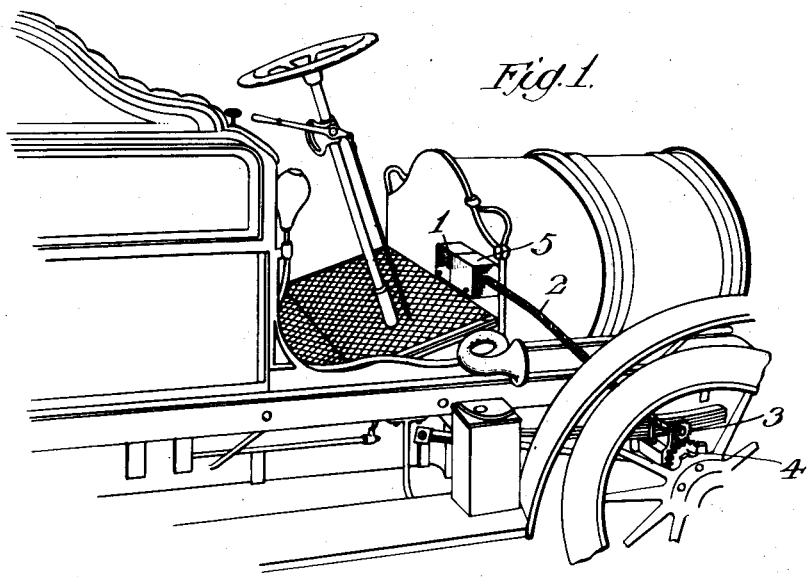
Figure 2:
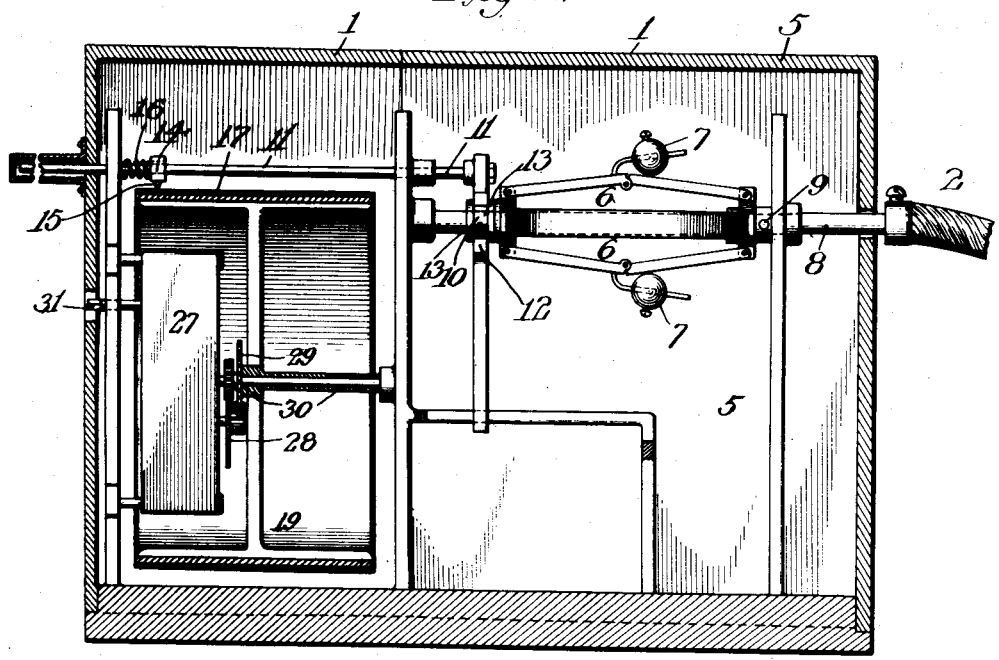

Figure 1—is a perspective view of the front part of an automobile showing my speed recording device in place thereon. Fig. 2—is a central longitudinal vertical section taken through the casing of the speed recording device, the governor therein being shown in elevation. Fig. 3—is a plan view thereof, the top of the casing being removed. Fig. 4—is a transverse section taken on line 4—4 of Fig. 3. Fig. 5—is a fragment in section of the paper carrying drum. Fig. 6—is a fragment of the record removed from the recording device with a record marked thereon.

My recording device 1-is preferably attached to the dash board of a car as shown in Fig. 1, the governor mechanism is operated through the flexible cable 2 carrying on its outer end a spur gear 3 meshing with a spur gear 4 mounted on the hub of the fore wheel of the car. Mounted in the casing 5 of the recording device is the governor 6 attached to and driven by the flexible cable 2. This governor is provided with the usual governor weights 7 and is keyed to the driving shaft 8 at one end as at 9 and carries at the inner end thereof a grooved support 10 which has a longitudinal movement on the driving shaft 8 and will move back and forth along the driving shaft in accordance with the speed at which the shaft travels. Workably secured to the support 10 is the record marker carrying rod 11 which is non-rotative in its bearings, but carries on its inner end a fork 12, the bifurcations of which drop into the grooves 13 in the traveling support 10 and moves the marker carrying rod along with the grooved support.

On the marker carrying rod is mounted the marker supporting bracket 14 to which is secured the record marker 15. Mounted in the downwardly projecting end of the bracket is a coiled spring 16 rigidly secured at one end to the marker carrying rod 11 and coiled around the rod, the free end of the spring resting upon the projecting end of the holding bracket. The tension of this spring being such as to keep the marker in spring pressed engagement with the record paper 17. This paper is mounted in a rolled form as shown in Fig. 4 on a central supporting rod or axle 18 and arranged to be fed over the operating drum 19 on the rotation thereof and wound into a receiving roll 20 on the other side of the operating drum. This drum carries upon its periphery a plurality of projecting lugs 21. These lugs project outwardly from the drum and project through apertures 43 in the record paper as it is fed around the drum from roll 17 to roll 20 and will thereby prevent any slipping of the paper on the drum and prevent the device from making a false record thereon. The perforations 43 in the record paper are arranged to register with the projecting lugs 21 on the rotating drum. These lugs are disposed irregularly along and around the drum to prevent shifting the record paper into different places on the drum, and thereby prevent a false record. It will also serve to wind up the roll 20 and not permit it to slip in the act of being wound up as this roll 20 is spring pressed against the periphery of the rotating drum by the spiral springs 22 which crowds the receiving roll against the rotating drum. The axle 23 of the receiving drum is carried by a journal box 24 in a longitudinal slot 25 in which the spiral spring 22 is mounted.

The marker carrying rod 11 is disposed above the rotating drum so as to hold the record marker 15 in place on the top of the drum. Surrounding the rotating drum 19 is placed a sheet of carbon paper 26 or other substance adapted to leave a record on the record paper where the same passes under the marker 15. The record paper is thin and transparent and any mark made on the under side will show through the same.

In Fig. 6 is shown a fragment of a record made, the vertical lines will indicate the miles, a line being drawn for every 10 miles and cross lines will indicate the hours, a line for every hour, the line 42 will indicate the standing line that is to say when the marker is over line 42 the car is standing. Motion is imparted to the rotating drum by means of clock work contained in the case 27 and the train of driving pinions 28. These pinions mesh with and engage the spur gear 29 keyed to the hub 30 of the rotating drum. I have not shown the driving mechanism employed as the same constitutes no part of my invention, but the well known mechanism used to operate a clock is well adapted to drive the rotating drum in a uniform manner.

My device is operated as follows: A roller of record paper 17 is placed upon the axle or supporting rod 18 and one end of the roll is passed over the rotating drum 19 and attached to the axle 23 and is wound thereon in the manner indicated in Fig. 4. The record paper being arranged as shown in Fig. 3 the clock work mechanism is wound up by turning the stem 31 by any suitable key. Now suppose it is a few minutes of 12 o'clock noon at which time it is desired to start the auto the record paper is so placed as to bring the line 12 M under the marker 15 as shown in Fig. 3. and the clock is started at 12 o'clock and assuming that the record paper as shown in Fig. 6 is in place under the marker, the marker will be at the point marked 32. In about 15 minutes the car is started at which time the index marker has run to point 33 from this point the car moves at a speed of about two miles an hour, which will cause the marker to pass to the point marked 34 from this point the car runs about 3/8 of a mile at a rate of about two miles an hour when the marker will have reached point 35. At this point the driver throws the high gear and pushes the car rapidly forward until the marker reaches the point 36 when the car is moving at a speed of 36 miles an hour. From this point a speed of 33 miles is maintained until the marker reaches point 37 when the speed is stopped suddenly from 33 to 18 miles an hour when the marker has reached the point 38. For the next quarter of a mile the speed of about 18 miles is maintained until the marker reaches point 39, from which point the speed is immediately accelerated until the marker reaches point 40 when a speed of 46 miles an hour has been reached. From this point the speed is increased to approximately 48 miles an hour and the marker reaches point 41 when at 2:30 the car is suddenly stopped, the marker having come back to the standing line 42 probably having collided with a telegraph pole. The record will disclose the fact that the car has been driven between the hours of 12 o'clock m. and 2:30 p. m. at various speeds during that time and will indicate the rate of speed maintained at any time during that period, and will show that at the time it was stopped at 2:30 p. m. it had been moving at a speed of 48 miles an hour.

Having described my invention what I claim as new and desire to secure by Letters Patent is:—

1. The combination with a drum, means for rotating the drum, and means for carrying a record sheet upon the drum, of a drive shaft, a governor on said drive shaft, a grooved support carried by the drive shaft, said support having a longitudinal movement on the shaft, a record marker carrying rod slidingly supported in bearings and having a fork on its inner end which engages the grooved support connected with the governor, a marker supporting bracket mounted on the marker carrying rod, a record marker secured to said bracket, and a spring rigidly secured at one end to the marker carrying rod and coiled around the latter with its free end resting upon the projecting end of the holding bracket.

2. In a speed recording device of the character herein described, means to prevent tampering with the record made on the record paper comprising a drum having brads projecting therefrom, irregularly disposed around the periphery of the drum in combination with record paper having openings therein adapted to register with and receive the radial brads on the rotating drum.

In witness that I claim the foregoing I have hereunto subscribed my name this 18 day of January, 1906.

WILLIAM A. CHEESEBRO.

Witnesses:
HENRY T. HAZARD,
EDMUND A. STRAUSE.